US009873426B2

(12) United States Patent
Paskus et al.

(10) Patent No.: US 9,873,426 B2
(45) Date of Patent: Jan. 23, 2018

(54) SYSTEM FOR MITIGATING VEHICLE SWAY

(71) Applicant: FORD GLOBAL TECHNOLOGIES, LLC, Dearborn, MI (US)

(72) Inventors: Anthony Paskus, Rochester Hills, MI (US); Neil Hurst, Livonia, MI (US); Marshall Erin Bates, Belle River, CA (US); Ashok E. Rodrigues, Farmington Hills, MI (US); Andrew Monticello, Farmington Hills, MI (US); Michael Edward Brewer, Dexter, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 8 days.

(21) Appl. No.: 15/188,557

(22) Filed: Jun. 21, 2016

(65) Prior Publication Data
US 2017/0361834 A1 Dec. 21, 2017

(51) Int. Cl.
*B60W 30/02* (2012.01)
*B60W 10/18* (2012.01)
*B60W 10/02* (2006.01)

(52) U.S. Cl.
CPC .......... *B60W 30/02* (2013.01); *B60W 10/026* (2013.01); *B60W 10/18* (2013.01); *B60W 2520/10* (2013.01); *B60W 2520/14* (2013.01); *B60W 2540/18* (2013.01); *B60W 2550/12* (2013.01); *B60W 2710/027* (2013.01); *B60W 2710/18* (2013.01)

(58) Field of Classification Search
CPC .... B60W 30/02; B60W 10/026; B60W 10/18; B60W 2520/10; B60W 2520/14; B60W 2550/12; B60W 2710/027; B60W 2710/18
See application file for complete search history.

(56) References Cited

U.S. PATENT DOCUMENTS

| 5,379,218 | A | * | 1/1995 | Jacobi | B62D 6/04 296/180.1 |
|---|---|---|---|---|---|
| 7,801,657 | B2 | | 9/2010 | Piyabongkarn et al. | |
| 2007/0256884 | A1 | * | 11/2007 | Wilhelm Rekow | B62D 5/09 180/403 |
| 2007/0265758 | A1 | * | 11/2007 | Miura | B60T 8/1755 701/72 |
| 2008/0183353 | A1 | * | 7/2008 | Post | B60G 17/0165 701/42 |

(Continued)

FOREIGN PATENT DOCUMENTS

DE 102010029245 A1 12/2011

*Primary Examiner* — Aaron L Troost
(74) *Attorney, Agent, or Firm* — James Dottavio; Brooks Kushman P.C.

(57) ABSTRACT

A vehicle includes friction brakes, an axle, and a controller. The axle has an electronic limited-slip differential that includes a variable torque capacity lockup clutch. The controller is programmed to, in response to a difference between desired and actual yaw rates exceeding a first threshold, increase the torque of the lockup clutch to decrease the difference between the desired and actual yaw rates. The controller is further programmed to, in response the difference between desired and actual yaw rates exceeding a second threshold that is greater than the first threshold, increase the torque of the friction brakes to decrease the difference between the desired and actual yaw rates.

17 Claims, 2 Drawing Sheets

(56) References Cited

U.S. PATENT DOCUMENTS

2013/0069798 A1* 3/2013 Jones .................. G01W 1/02
340/905
2014/0005892 A1 1/2014 Bär et al.

* cited by examiner

SYSTEM FOR MITIGATING VEHICLE SWAY

TECHNICAL FIELD

The present disclosure relates to a system for mitigating vehicle sway.

BACKGROUND

Vehicles may experience undesirable yaw rates when the vehicle encounters external lateral forces. Undesirable yaw rates may decrease the ability of a vehicle operator to control the vehicle.

SUMMARY

A vehicle includes friction brakes, an axle, and a controller. The axle has an electronic limited-slip differential that includes a variable torque capacity lockup clutch. The controller is programmed to, in response to a difference between desired and actual yaw rates exceeding a first threshold, increase the torque of the lockup clutch to decrease the difference between the desired and actual yaw rates. The controller is further programmed to, in response the difference between desired and actual yaw rates exceeding a second threshold that is greater than the first threshold, increase the torque of the friction brakes to decrease the difference between the desired and actual yaw rates.

A vehicle controller includes input channels, output channels, and control logic. The input channels are configured to receive signals indicative of yaw rates. The output channels are configured to provide commands to adjust friction brake torque and a differential lockup clutch torque to counteract yaw rates. The control logic is programmed to, in response to a difference between desired and actual yaw rates exceeding a first threshold, increase the lockup clutch torque. The control logic is further programmed to, in response to the difference between desired and actual yaw rates exceeding a second threshold that is greater than the first threshold, increase the friction brake torque.

A vehicle includes a steering wheel, friction brakes, an axle, and a controller. The axle has an electronic limited-slip differential that includes a variable torque capacity lockup clutch. The controller is programmed to, in response to a yaw rate in an absence of steering wheel input, increase lockup clutch torque to counteract the yaw rate when the yaw rate exceeds a first threshold. The controller is further programmed to increase friction brake torque to counteract the yaw rate when the yaw rate exceeds a second threshold that is greater than the first threshold.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
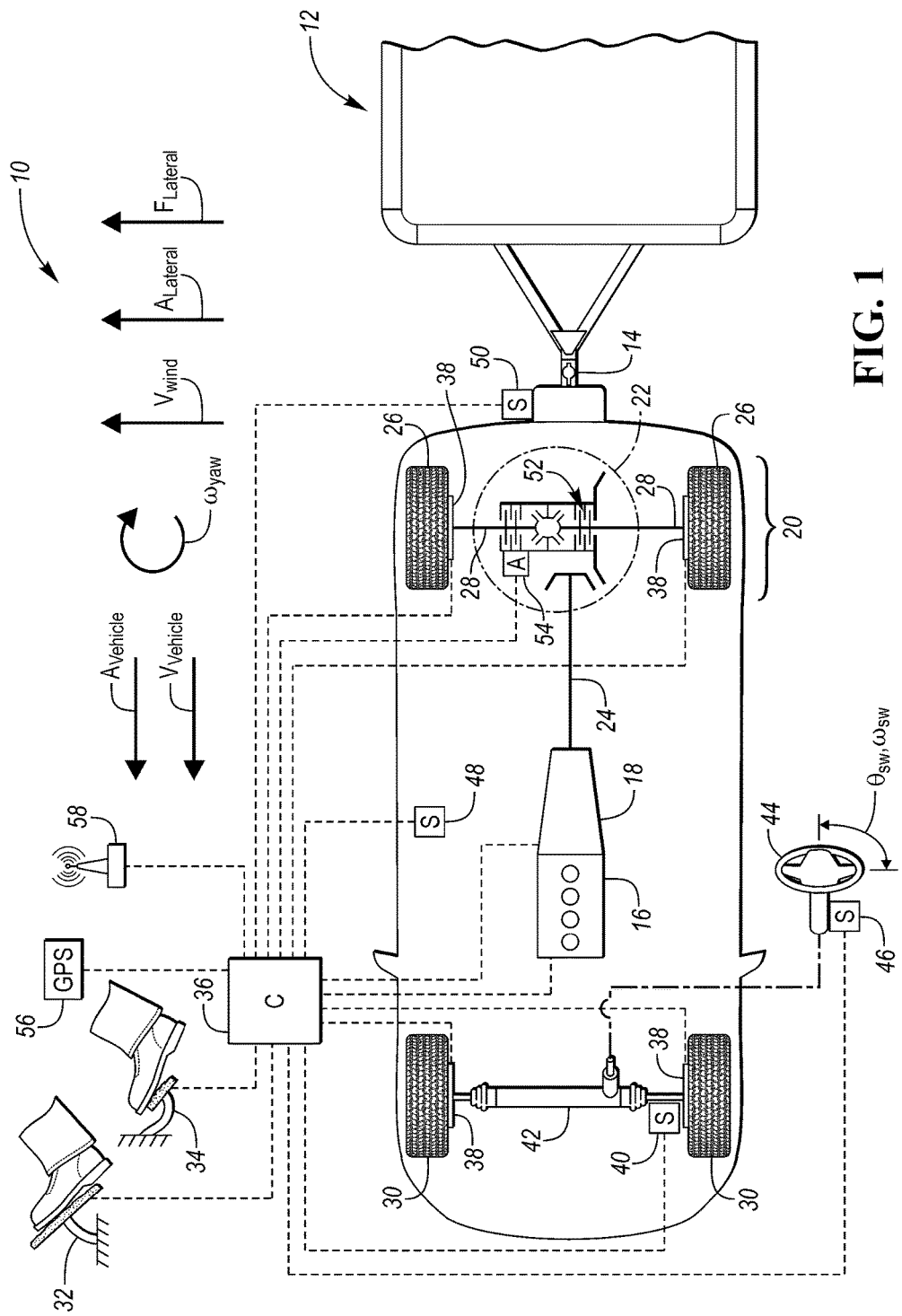
FIG. 1 is a schematic diagram representative of a vehicle and a trailer that is connected to a towing connection of the vehicle.

Referring to FIG. 1, a schematic diagram representative of a vehicle 10 and a trailer 12 that is connected to a towing connection or hitch 14 of the vehicle 10 is illustrated. The vehicle 10 includes a powertrain. The powertrain includes both power generating components (i.e., engines or electric motors) and the drivetrain. The drivetrain is the group of components that deliver power to the driving wheels, excluding the power generating components. In contrast, the powertrain is considered to include both the power generating components and the drivetrain. The powertrain includes both an engine 16 and a transmission 18. The transmission 18 may be configured to provide multiple gear ratios between an input and an output of the transmission 18. The transmission 18 may be connected to an axle 20 through a series of drivetrain components. More specifically, the transmission 18 may be connected to a differential 22 of the axle 20 through a driveshaft 24. The differential 22 in turn may be connected to the hubs of drive wheels 26 through half shafts 28. There may be additional drivetrain connections between the transmission 18 and the drive wheels 26. For example, constant-velocity joints (not shown) may connect the transmission 18 to the driveshaft 24, the driveshaft 24 to the differential 22, the differential 22 to the half shafts 28, and/or the half shafts 28 to hubs of the driving wheels 26.

The driving wheels 26 depicted in FIG. 1 are shown as the rear wheels of the vehicle 10. However, it should be understood that the front wheels 30 may also be driving wheels. For example, the front wheels 30 may be connected to the transmission 18 through a series of drivetrain components such as driveshafts, half shafts, differentials, transfer cases, constant-velocity joints, etc. in a manner similar to how the rear wheels are connected to the transmission 18, but not necessarily in the same order or configuration. Furthermore, although an engine 16 is shown to be the power generating component of the powertrain, other power generating components (i.e., electric motors or fuel cells) may be used in place of or in addition to (such as with hybrid vehicles) the engine 16.

It should be understood that the vehicle configuration described herein is merely exemplary and is not intended to be limited. Other non-hybrid, electric, or hybrid vehicle configurations should be construed as disclosed herein. Other vehicle configurations may include, but are not limited to, micro-hybrid vehicles, series hybrid vehicles, parallel hybrid vehicles, series-parallel hybrid vehicles, plug-in hybrid electric vehicles (PHEVs), fuel cell hybrid vehicles, battery operated electric vehicles (BEVs), or any other vehicle configuration known to a person of ordinary skill in the art.

An operator of the vehicle 10 may control the speed of the vehicle and/or the torque that is being applied at the drive wheels 26 of the vehicle 10 by depressing either an accelerator pedal 32 or a brake pedal 34. Depressing the accelerator pedal 32 may coincide with a request for an increase in vehicle speed and/or torque. Depressing the brake pedal 34 may coincide with a request for a decrease in vehicle speed and/or torque. Depressing either the accelerator pedal 32 or brake pedal 34 may send either an acceleration request or a breaking request, respectively, to a vehicle controller 36. The vehicle controller 36, in turn, may adjust a speed and/or torque of the engine 16, cause a shift in the transmission 18, or adjust a torque that is being applied to friction brakes 38, based on the acceleration or braking request and the current vehicle speed $V_{vehicle}$. A speed sensor 40 may be configured to communicate the vehicle speed to the controller 36. The speed sensor 40 may be configured to calculate the rotational speed of one or more of the vehicle wheels and the controller 36 may include an algorithm that is configured to determine the current vehicle speed $V_{vehicle}$ based on the rotational speed of one or more of the vehicle wheels. The controller 36 may also include an algorithm that is configured to determine the current vehicle acceleration $A_{vehicle}$ based rotational speed measurements of one or more of the vehicle wheels received from the speed sensor 40 or based on inputs from other sensors (e.g., accelerometers). The algorithm used to determine vehicle acceleration $A_{vehicle}$ may be based on measured changes in the rotational speed over time of one or more of the vehicle wheels.

The vehicle 10 may also include a steering system 42 that is configured to turn the front wheels 30 based on a user input received from a steering wheel 44. A steering wheel sensor 46 may be configured to communicate the current angular displacement $\theta_{sw}$ of the steering wheel 44 (which may also be referred to as the steering wheel angle) and/or the current angular speed $\omega_{sw}$ of the steering wheel 44 to the controller 36. The current angular displacement $\theta_{sw}$ and/or the current angular speed $\omega_{sw}$ of the steering wheel 44 may include angular displacements and angular speeds, respectively, in either a clockwise or counterclockwise direction.

Other additional sensors may also be configured to detected and communicate various states or conditions of the vehicle 10 and/or the trailer 12 to the controller 36. For example, the vehicle 10 and/or trailer may include additional sensors 48, such as accelerometers, that are configured to detect, measure, and communicate lateral acceleration $A_{lateral}$ of the vehicle 10 and/or trailer 12, lateral forces $F_{lateral}$ acting on the vehicle 10 and/or trailer 12, wind velocity or speed (including head, tail, and cross wind speeds) $V_{wind}$, or the yaw rate $\omega_{yaw}$ of the vehicle 10 and/or trailer 12. Sensors that are configured to detect accelerations, forces, or rotational speeds (e.g., yaw rates) may be accelerometers, while sensors configured to detect winds speeds may be anemometers (e.g. pilot tubes). Although the sensors 48 are depicted as one sensor in FIG. 1, it should be understood that the sensor 48 may be representative of multiple sensors. Furthermore, a trailer sensor 50 may be configured to detect and communicate to the controller 36 whether or not the trailer 12 is connected to the towing connection or hitch 14.

The differential 22 may be an electronically controlled limited slip differential. The differential 22 may include a lockup clutch 52. The lockup clutch 52 may be a variable torque capacity lockup clutch that is configured to decrease the relative speeds of the opposing wheels 26 on the axle 20 as the lockup clutch torque increases. The torque of the lockup clutch 52 may be adjusted between a completely disengaged condition and a completely locked condition, including a slipping condition between the completely disengaged condition and completely locked condition. As the torque on the lockup clutch 52 increases during the slipping condition, the relative speeds of the opposing wheels 26 on the axle 20 will decrease. When the lockup clutch 52 obtains a torque that is sufficient to lock the differential 22, the speeds of the opposing wheels 26 become synchronized and the relative speeds of the opposing wheels 26 becomes zero. The differential 22 may include an actuator 54 that is configured to engage/disengage lockup clutch 52 by increasing or decreasing the torque acting on the lockup clutch 52. The actuator 54 may receive signals from the controller to increase or decrease the torque on the lockup clutch 52. The actuator 54 may be an electrical solenoid, hydraulic valve, or any other device known in the art that is capable of increasing and decreasing torque on a clutch. The actuator 54 may also act as a sensor that communicates the amount of torque acting on the lockup clutch 52 back to the controller 36.

The vehicle 10 may also include a GPS or navigation system 56. The GPS system 56 may be configured to determine current locations of the vehicle 10 and future locations of the vehicle 10. Future locations of the vehicle 10 may be based on current speed and the direction that the vehicle is currently traveling in. Alternatively, future locations of the vehicle may be based on a current route that is programmed into the GPS system 56 and an estimated arrival time of the final destination based on the current route. The vehicle 10 may also include a wireless receiver 58. The wireless receiver 58 may be configured to receive and communicate wireless data to the controller. The wireless data may be received via radio, Wi-Fi, long term evolution (LTE), Bluetooth, near-field communication (NFC), or any other form of wireless communication known in the art. The wireless data may be transmitted from other vehicles via vehicle-to-vehicle communication, from radio towers, from cellular communication towers, or any other wireless transmission devices known in the art. The wireless data may include news stories, current and future weather information, GPS location, or any other relevant information that the may be desirable for the vehicle operator or the vehicle occupants.

While illustrated as one controller, the controller 36 may be part of a larger control system and may be controlled by various other controllers throughout the vehicle 10, such as a vehicle system controller (VSC). It should therefore be understood that the controller 36 and one or more other controllers can collectively be referred to as a "controller" that controls various actuators in response to signals from various sensors to control functions the vehicle 10 or vehicle subsystems. The controller 36 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 36 in controlling the vehicle 10 or vehicle subsystems.

Control logic, algorithms, or functions performed by the controller 36 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

The controller 36 may be configured to receive various states or conditions of the various vehicle components illustrated in FIG. 1 via electrical signals. The electrical signals may be delivered to the controller 36 from the various components via input channels. Additionally, the electrical signals received from the various components may be indicative of a request or a command to change or alter a state of one or more of the respective components of the vehicle 10. The controller 36 includes output channels that are configured to deliver requests or commands (via electrical signals) to the various vehicle components. The controller 36 includes control logic and/or algorithms that are configured to generate the requests or commands delivered through the output channels based on the requests, commands, conditions, or states of the various vehicle components.

The input channels and output channels are illustrated as dotted lines in FIG. 1. It should be understood that a single dotted line may be representative of both an input channel and an output channel into or out of a single element. Furthermore, an output channel out of one element may operate as an input channel to another element and vice versa.

Figure 2:
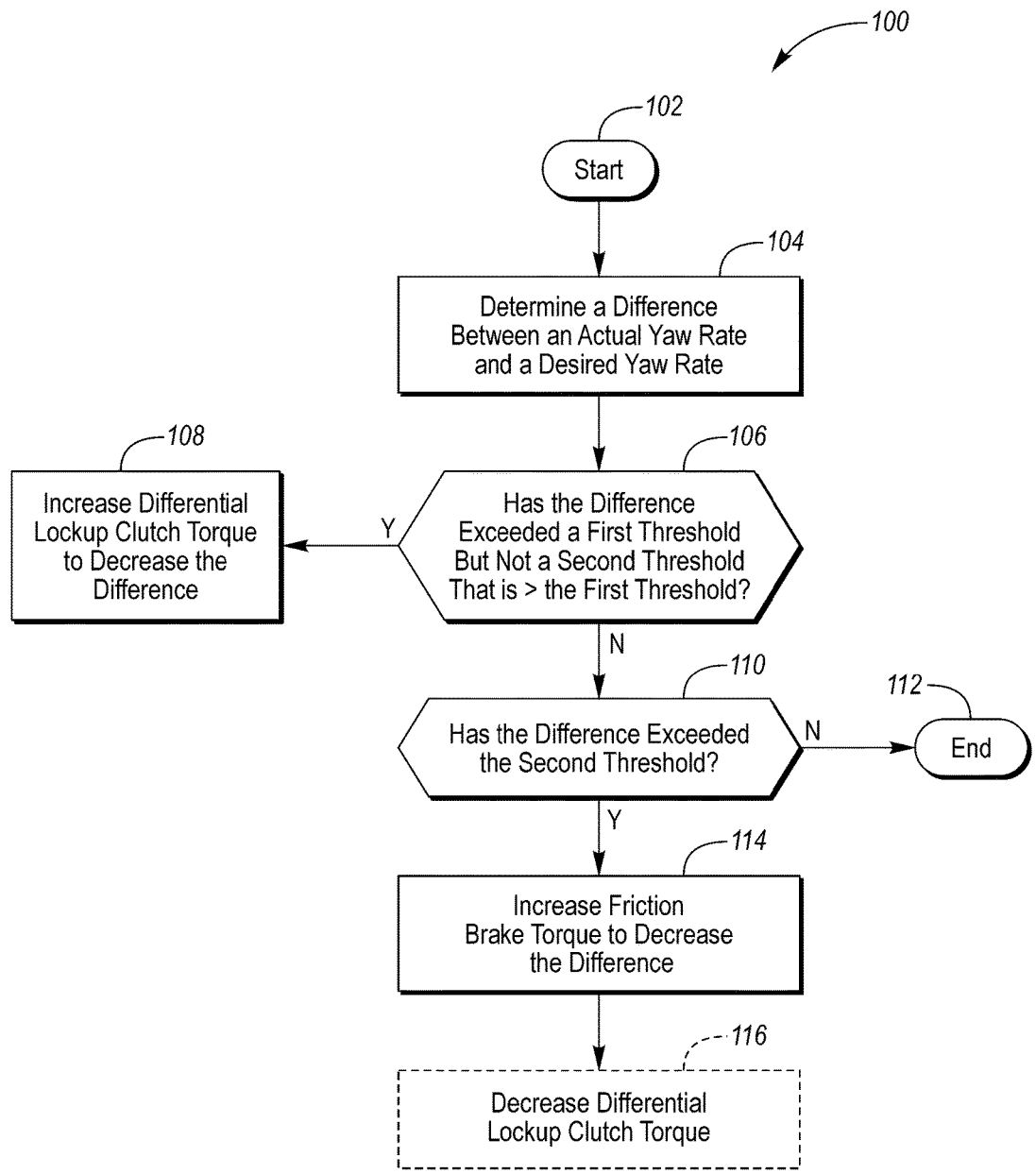
FIG. 2 is a flowchart illustrating a control method for mitigating vehicle sway.

Referring to FIG. 2, a flowchart of a control method 100 for mitigating vehicle sway is illustrated. The method 100 may be implemented whether or not the trailer 12 is connected to the towing connection or hitch 14 of the vehicle 10. The method 100 may be stored as algorithms and/or control logic within the controller 36. The controller 36 may be configured to send commands to the various components of the vehicle 10 in order to implement the method 100. The method 100 is initiated at the start block 102. Once the method 100 has been initiated, the method moves on to block 104 where the method 100 determines if there is a difference between and an actual yaw rate $\omega_{yaw\_act}$ of the vehicle 10 and a desired yaw rate $\omega_{yaw\_des}$ of the vehicle 10.

The actually yaw rate $\omega_{yaw\_act}$ may be measured via sensors, as described above. Alternatively, the actual yaw rate $\omega_{yaw\_act}$ may be based on estimation of the desired yaw rate $\omega_{yaw\_des}$ and an estimation of the difference between the actual yaw rate $\omega_{yaw\_act}$ and the desired yaw rate $\omega_{yaw\_des}$. The desired yaw rate $\omega_{yaw\_des}$ may be estimated based on an algorithm that uses the current steering wheel angle $\theta_{sw}$ and the current vehicle speed $V_{vehicle}$ to calculate the desired yaw rate $\omega_{yaw\_des}$.

The difference between the actual yaw rate $\omega_{yaw\_act}$ and the desired yaw rate $\omega_{yaw\_des}$ may be based on a measured actual yaw rate $\omega_{yaw\_act}$ and an estimated desired yaw rate $\omega_{yaw\_des}$. Alternatively, the difference between the actual yaw rate $\omega_{yaw\_act}$ and the desired yaw rate $\omega_{yaw\_des}$ may be based on the lateral forces $F_{lateral}$ acting upon the vehicle 10. The lateral forces $F_{lateral}$ acting upon the vehicle may be measured via sensors, as described above, or may be estimated. The lateral forces $F_{lateral}$ may be based on inputs from the road surface (e.g., when the wheels come into contact with a pothole or a curb). Alternatively, the lateral forces $F_{lateral}$ may be based on the lateral wind forces acting upon the vehicle 10. More, specifically, the lateral forces $F_{lateral}$ may be estimated based on an algorithm that uses an estimated cross wind speed and the side profile of the vehicle 10 to calculate the lateral forces $F_{lateral}$. The estimated cross wind speed may be may be measured via sensors, as described above. Alternatively, the estimated cross wind speed may be based on transmitted data (e.g., weather or wind data) that is received by the controller 36. The transmitted data may correspond with the location of the vehicle 10 (e.g., GPS location). The estimated cross wind speed may include the current cross wind speed the vehicle 10 is encountering. The estimated cross wind speed may include a future cross wind speed that the vehicle 10 may encounter. The future cross wind speed may be used in calculating the lateral forces $F_{lateral}$ acting upon the vehicle 10 when the expected time arrives that the vehicle 10 will encounter the future cross wind. The vehicle 10 may expect to encounter future cross winds based on the current vehicle speed $V_{vehicle}$, direction the vehicle 10 is traveling, wind data of future locations of the vehicle 10, and/or specific geographical areas that are susceptible to cross winds (e.g., bridges or canyons).

Yaw rates of the vehicle 10 that are caused by cross winds may be distinguishable from yaw rates caused by other events (e.g., turning the vehicle 10 while in motion). For example, when the vehicle 10 experiences yaw rates caused by cross winds, an increase in lateral acceleration $A_{lateral}$ of the vehicle 10 may precede an increase in the actual yaw rate $\omega_{yaw\_act}$ of the vehicle 10. On the other hand, when the vehicle 10 experiences yaw rates caused by events other than cross winds, the increase in the actual yaw rate $\omega_{yaw\_act}$ may precede an increase in the lateral acceleration $A_{lateral}$ of the vehicle 10.

Once it is determined at block 104 if there is a difference between and the actual yaw rate $\omega_{yaw\_act}$ and the desired yaw rate $\omega_{yaw\_des}$ of the vehicle 10, the method 100 moves on to block 106 where it is determined if the difference between and the actual yaw rate $\omega_{yaw\_act}$ and the desired yaw rate $\omega_{yaw\_des}$ has exceeded a first threshold but not a second threshold that is greater than the first threshold. If the difference has exceeded the first threshold but not the second, the method moves on to block 108 where the torque of the differential lockup clutch 52 is increased to decrease the difference (which may be representative of an undesirable amount of additional yaw). The torque of the lockup clutch 52 may be increased proportionally as the difference between and the actual yaw rate $\omega_{yaw\_act}$ and the desired yaw rate $\omega_{yaw\_des}$ increases between the first and second thresholds. Furthermore, the lockup clutch 52 may be closed to create a torque differential between opposing wheels on a single axle to generate a yaw that is in an opposing direction of and counteracts an undesirable yaw (i.e., the difference between and the actual yaw rate $\omega_{yaw\_act}$ and the desired yaw rate $\omega_{yaw\_des}$).

If it is determined at block 106 that the difference between and the actual yaw rate $\omega_{yaw\_act}$ and the desired yaw rate $\omega_{yaw\_des}$ has not exceeded the first threshold while at the same time not exceeding the second threshold, the method 100 moves on to block 110 where it is determined if the difference has exceeded the second threshold. If the difference has not exceeded the second threshold, the method ends at block 112. If the difference has exceeded the second threshold, the method moves on to block 114 where the torque of at least one of the frictions brakes 38 is increased to decrease the difference (which may be representative of an undesirable amount of additional yaw). The torque of the friction brakes 38 may be increased proportionally as the difference between and the actual yaw rate $\omega_{yaw\_act}$ and the desired yaw rate $\omega_{yaw\_des}$ further increases above the second threshold. Furthermore, the torque applied to the friction brakes 38 may create a torque differential between opposing wheels on a single axle to generate a yaw that is in an opposing direction of and counteracts an undesirable yaw (i.e., the difference between and the actual yaw rate $\omega_{yaw\_act}$ and the desired yaw rate $\omega_{yaw\_des}$). The torque differential may be caused by increasing the braking force of one wheel relative to the braking force of the opposing wheel on the same axle. In addition to using the lockup clutch 52 and/or the friction brakes 38 to counteract an undesirable yaw of the vehicle 10, the method 100 may be configured to drive the overall yaw rate of the vehicle toward the desired yaw rate $\omega_{yaw\_des}$.

The method may also include decreasing the torque of the lockup clutch 52 at block 116 once the difference between and the actual yaw rate $\omega_{yaw\_act}$ and the desired yaw rate $\omega_{yaw\_des}$ has exceeded the second threshold. This may include decreasing the torque of the lockup clutch 52 that was generated in block 108 to zero or proportionally as the torque of the friction brakes 38 increases in block 114.

In circumstances when a desired yaw rate $\omega_{yaw\_des}$ is at or near zero, the method 100 may be configured to increase the torque of the lockup clutch 52 to counteract a yaw rate of the vehicle 10 that is between the first and second thresholds and increase the toque of the friction brakes 38 to counteract a yaw rate of the vehicle that is above the second threshold. The absence of a steering wheel input may be indicated of a zero desired yaw rate $\omega_{yaw\_des}$. Under circumstances where the desired yaw rate $\omega_{yaw\_des}$ is at or near zero and in addition to using the lockup clutch 52 and/or the friction brakes 38 to counteract the yaw rate of the vehicle 10, the method 100 may be configured to drive the overall yaw rate of the vehicle to zero.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
   friction brakes;
   an axle having an electronic limited-slip differential including a lockup clutch; and
   a controller programmed to,
      in response to a difference between desired and actual yaw rates exceeding a first threshold, increase lockup clutch torque to decrease the difference, and
      in response to the difference exceeding a second threshold that is greater than the first threshold, decrease lockup clutch torque and increase friction brake torque to decrease the difference.

2. The vehicle of claim 1, wherein the desired yaw rate is based on a steering wheel angle.

3. The vehicle of claim 2, wherein the desired yaw rate is further based on vehicle speed.

4. The vehicle of claim 3, wherein the difference is based on an external lateral force.

5. The vehicle of claim 4, wherein the external lateral force is based on an estimated cross wind.

6. The vehicle of claim 5, wherein estimated cross wind is based on transmitted weather data received by the controller.

7. The vehicle of claim 4, wherein the external lateral force is based on an input from road surface.

8. The vehicle of claim 1, wherein the difference is based on a measured yaw rate and the desired yaw rate.

9. A vehicle controller comprising:
   input channels configured to receive signals indicative of yaw rates;
   output channels configured to provide commands to adjust friction brake and differential lockup clutch torques to counteract yaw rates; and
   control logic programmed to,
      in response to a difference between desired and actual yaw rates exceeding a first threshold, increase lockup clutch torque, and
      in response to the difference exceeding a second threshold that is greater than the first threshold, decrease lockup clutch torque and increase friction brake torque.

10. The controller of claim 9, wherein the desired yaw rates are based on a steering wheel angle.

11. The controller of claim 10, wherein the desired yaw rates are further based on vehicle speed.

12. The controller of claim 11, wherein the difference is based on an external lateral force.

13. The controller of claim 12, wherein the external lateral force is based on an estimated cross wind.

14. The controller of claim 13, wherein estimated cross wind is based on transmitted weather data received by the controller.

15. The controller of claim 14, wherein the transmitted weather data corresponds to a GPS location of the vehicle.

16. The controller of claim 12, wherein the external lateral force is based on an input from road surface.

17. A vehicle comprising:
   a steering wheel;
   friction brakes;
   an axle having an electronic limited-slip differential including a lockup clutch; and a controller programmed to, in response to a yaw rate in an absence of steering wheel input, increase lockup clutch torque to counteract the yaw rate when the yaw rate exceeds a first threshold, decrease lockup clutch torque when the yaw rate exceeds a second threshold that is greater than the first threshold, and increase friction brake torque to counteract the yaw rate when the yaw rate exceeds the second threshold.

* * * * *